United States Patent
Qureshi et al.

(10) Patent No.: US 6,633,810 B1
(45) Date of Patent: Oct. 14, 2003

(54) GRAPHICAL SYSTEM AND METHOD FOR DEFINING PILOT TASKS, PATTERNS AND CONSTRAINTS

(75) Inventors: Hisham M. Qureshi, Glendale, AZ (US); Stephen G. McCauley, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 129 days.

(21) Appl. No.: 09/680,366

(22) Filed: Oct. 5, 2000

Related U.S. Application Data
(60) Provisional application No. 60/233,825, filed on Sep. 19, 2000.

(51) Int. Cl.$^7$ ................................................ G09G 5/08
(52) U.S. Cl. .................. 701/206; 701/208; 701/211; 340/975; 244/158 R; 73/178 R
(58) Field of Search .................. 701/206–11, 13, 701/14, 16, 208, 211; 340/975, 974, 973; 244/158 R, 175; 73/178 R

(56) References Cited

U.S. PATENT DOCUMENTS 5,025,382 A   6/1991   Artz
5,340,061 A   8/1994   Vaquier et al.
5,978,715 A * 11/1999  Briffe et al. ............... 701/11
6,112,141 A   8/2000   Briffe et al. ............... 701/14

FOREIGN PATENT DOCUMENTS

EP    0763714 A    3/1997

OTHER PUBLICATIONS

Lin C E et al, "An Automated TCA Monitor System for Air Traffic Control," Aerospace and Electronics Conference, 1994. Naecon 1994., Proceedings of the IEEE 1994 National Dayton, OH, USA 23–27. May 1994, New York, NY, USA, IEEE, May 23, 1994, pp. 1317–1324, XP01022293 ISBN: 0–7803–1893–5; figures 2, 4.

* cited by examiner

Primary Examiner—William A. Cuchlinski, Jr.
Assistant Examiner—Arthur D. Donnelly

(57) ABSTRACT

Various embodiments of the invention suitably provide dialog boxes in response to pilot commands so that task parameters may be input or modified. Pilot tasks include "direct-to", "hold", "procedure turn", "cross with flyover", "show info", "orbit", "radial", and the like. According to various embodiments, certain dialog boxes include graphical functionality and incorporate 'human factors' enhancements such that information is efficiently presented in a manner that corresponds to air traffic control instructions.

28 Claims, 18 Drawing Sheets

GRAPHICAL SYSTEM AND METHOD FOR DEFINING PILOT TASKS, PATTERNS AND CONSTRAINTS

PRIORITY INFORMATION

This application claims priority of U.S. Provisional Application Serial No. 60/233,825, "Method and Apparatus for Controlling an Aircraft" filed on Sep. 19, 2000 and claiming Mark Snyder, Michael Gyde and Hisham Qureshi as inventors, which is incorporated herein by reference.

TECHNICAL FIELD OF THE INVENTION

The present invention relates generally to aircraft cockpit interfaces, and more particularly to a system and method for defining tasks, patterns and constraints in an aircraft interface.

BACKGROUND OF THE INVENTION

Pilots often rely upon gauges, instruments and other indicators to monitor the performance of their aircraft. Pilots also make use of a complex array of controls such as steering wheels/yoke, foot pedals, switches, computer controls, and the like to fly, navigate and otherwise control their vehicles. A pilot's awareness and coordination of various aircraft modes and conditions is important to optimum aircraft performance and safety. For example, the pilot should be aware of the aircraft's automation state at any given time and the pilot should be able to easily coordinate the flight director modes. Moreover, the pilot should be able to easily view and coordinate the tracking of the aircraft to current modes and targets. Many existing cockpit controls, however, which may be of the panel mounted variety or of the head up display (HUD) variety and which may be commonly found in commercial, military, and civilian aircraft, often include various systems distributed throughout the cockpit, thereby often requiring the pilot to intermittently scan various areas of the cockpit to obtain and analyze the aircraft information. Moreover, these devices often provide large amounts of data in a manner that requires a substantial amount of pilot attention to fully comprehend.

To assist the pilot, aircraft flight displays continue to advance in sophistication, achieving increasingly higher levels of information density and, consequently, presenting a greater amount of visual information to be perceived and understood by the operator. In many applications, it is often important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, annunciators, and the like. Similarly, detailed guidelines related to electronic displays can be found in FAA Advisory Circular 20–88A, *Guidelines on the Marking of Aircraft Powerplant Instruments* (September 1985), both of which are incorporated by reference.

Further, systems integrators such as Honeywell International Inc. of Phoenix, Ariz., have built flight control systems that greatly improve the ease-of-use of avionics (i.e. aviation electronics) systems. The PRIMUS EPIC suite of avionics components available from Honeywell International Inc. of Phoenix, Ariz., for example, includes a comprehensive suite of integrated flight electronics such as flight management systems (FMS), autopilots, cockpit displays, flight controls, and the like, as well as interoperability with navigational instruments such as global positioning systems (GPS), inertial reference systems (IRS), and the like. In particular, the PRIMUS EPIC suite includes an integrated avionics display including cursor control, windowing of information, movable navigation maps, ground-based weather, real-time video, aircraft utility system display and control, and the like.

Various embodiments of the PRIMUS EPIC suite include a "point and click" navigation capability referred to as "Graphical INAV", also provided by Honeywell International Inc. of Glendale, Ariz. Various aspects of this capability are described, for example, in United States patent application "METHODS AND APPARATUS FOR REAL-TIME PROJECTION AND RENDERING OF GEOSPATIALLY ORGANIZED DATA", filed on Sep. 14, 2000, (claiming priority of U.S. Provisional Patent Application Serial No. 60/153,900, filed Sep. 14, 1999) and naming the following inventors: Mark I. Snyder, Gary Teskey, Blake W. Wilson, and Matt Hilbert, incorporated herein by reference. Another graphical flight planning system is described in U.S. Pat. Ser. No. 6,112,141, incorporated herein by reference. As part of the "point and click" functionality incorporated within certain graphical flight planning environments, pilots are allowed to click on a map location (e.g. a waypoint) and to obtain a menu of tasks that may be executed relating to that location. To complete the definition of the task, an interface for obtaining additional information is presented to the pilot, and the pilot suitably enters information through a keyboard, mouse/cursor apparatus, keypad, or the like. To define a holding pattern about a waypoint, for example, a pilot simply clicks on the waypoint, selects "hold" from the ensuing menu of task options, and then enters or modifies parameters such as hold radial, hold leg distance, and hold turn direction as appropriate.

Although the PRIMUS EPIC suite and INAV technology represent quantum leaps forward in avionics technology, even further enhancements to cockpit displays that allow for improved ease-of-use may be desirable. In particular, such enhancements would create interfaces for common pilot tasks that are intuitive, easy-to-use and closely related to instructions from air traffic control (ATC).

BRIEF SUMMARY OF EXEMPLARY EMBODIMENTS

Various embodiments of the invention suitably provide dialog boxes in response to pilot commands so that task parameters may be input or modified. Pilot tasks include "direct-to", "hold", "procedure turn", "cross constraints with flyover", "show info", "orbit", "radial", and the like. According to various embodiments, certain dialog boxes include graphical functionality and incorporate 'human factors' enhancements such that information is efficiently presented in a manner that corresponds to air traffic control instructions.

BRIEF DESCRIPTION OF EXEMPLARY DRAWING FIGURES

The features and advantages of the present invention are hereinafter described in the following detailed description of illustrative embodiments to be read in conjunction with the accompanying drawing figures, wherein like reference numerals are used to identify the same or similar parts in the similar views, and:

DETAILED DESCRIPTION OF EXEMPLARY EMBODIMENTS

Figure 1:
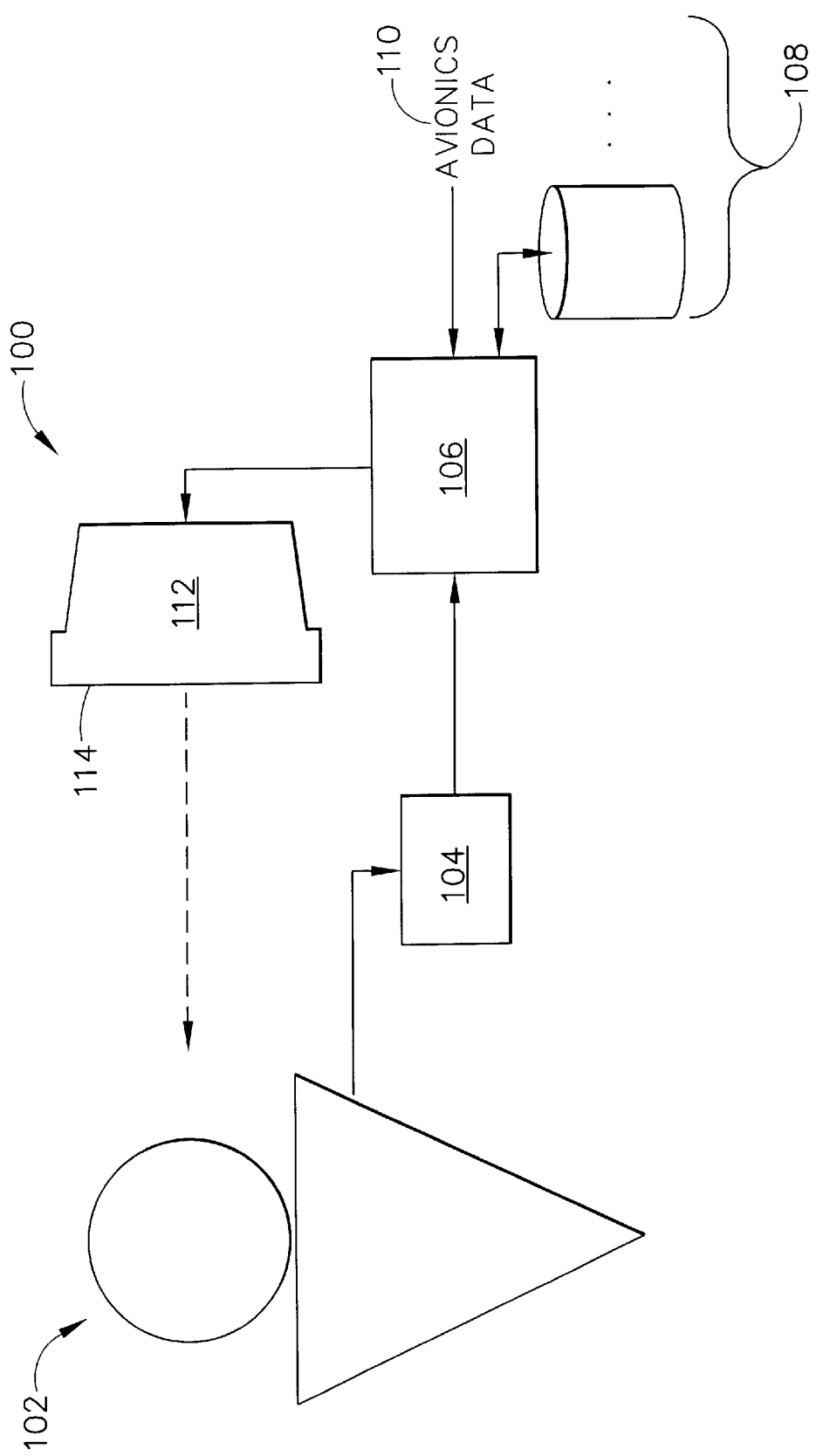
FIG. 1 is a block diagram of an exemplary display system.

Systems and methods in accordance with various aspects of the present invention provide an improved multi-functional display (MFD) with enhanced dialog boxes for common tasks such as holding patterns, radial patterns, procedure turns and the like. In an exemplary embodiment, the dialog boxes are optimized to correspond to air traffic control phraseology and incorporate graphical information. These systems and methods are useful for inflight operations, graphical flight planning, aircraft simulators, and the like.

In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual process steps may be performed.

It should be appreciated that the particular implementations shown and described herein are illustrative of the invention and its best mode and are not intended to otherwise limit the scope of the present invention any way. Indeed, for the sake of brevity, conventional techniques and components related to aircraft attitude detection, flight instrumentation, liquid crystal displays, HUDs, image rendering, navigation and guidance methodologies, and other functional aspects of the systems (and components of the individual operating components of the systems) may not be described in detail herein. Furthermore, the primary flight display (PFD) or multi-function display (MFD) images shown in the various figures are illustrative in nature and are not intended to limit the scope or applicability of the present invention in any way.

Briefly, referring now to FIG. 1, an exemplary MFD system 100 suitably includes a processor 106 configured to communicate with an input device 104, an associated monitor (or monitors) 112, one or more data sources 108, and avionics data 110. In general, a user (e.g., a pilot 102) located within a vehicle (e.g., aircraft) (not shown) may provide input to processor 106 through input device 104 and receive visual feedback regarding the status of the aircraft via a display 114 produced by monitor 112. MFD system 100 may be suitably configured for use in a commercial aircraft or any vehicle in which modes, targets, attitudes and/or relative position information is to be displayed. MFD system 100 may be further configured such that display element 112 produces an enhanced rendering of the mode and target information, as viewed by the pilot of the aircraft. A number of aspects of display element 112 (which are controlled by processor 106 in a practical embodiment) may contribute to the improved contents and appearance of the MFD 114, thus increasing the situational awareness of the pilot and/or flight crew. The image generation and display aspects may leverage known techniques such that existing MFD systems can be modified in a straightforward manner to support the different features described herein. In a practical implementation, the concepts described herein may be realized in the form of revised display generation software or processing resident at processor 106.

Processor 106 encompasses one more functional blocks used to provide flight management and control, interface with the pilot, and input to monitor 112. Processor 106 may include or cooperate with a mode, position and/or detection element that is capable of determining the mode or position of the vehicle relative to one or more reference locations, points, planes, or targets. In addition, processor 106 may be configured to receive, analyze, condition, and process target and/or bearing data associated with the vehicle. In this regard, processor 106 may include any number of individual microprocessors, flight computers, navigation equipment, memories, storage devices, interface cards, and other standard components known in the art. Moreover, processor 106 may include any number of microprocessor elements, memory elements, power supplies, and other functional components as necessary to support the operation of MFD system 100. In this respect, processor 106 may include or cooperate with any number of software programs or instructions designed to carry out various methods, process tasks, calculations, control functions, and the generation of display signals and other data used by display element 112. For example, processor 106 may be configured to generate an annunciator associated with the position of the aircraft relative to at least one reference location, to generate windows corresponding to user inputs, and the like.

In accordance with another aspect of the invention, processor 106 may be further configured to receive and process information associated with an approach target of flight plan for the aircraft, e.g., destination runway. Processor 106 may also be suitably configured to receive and process target and/or bearing data 108 related to an intended destination of the aircraft. In a practical commercial aircraft application, such data 108 may be associated with specific landing coordinates, a runway, a waypoint, an airport, or the like. As described in more detail below, processor 106 may process data 108 and generate appropriate signals to display element 112 such that display element 112 generates indicia representative of the appropriate approach target, flight plan, or the like. Such processors and flight control computers are available from a number of manufacturers such as Honeywell International Inc. In an exemplary embodiment, processor 106 is incorporated within a flight management system (FMS) or another avionics component which, inter alia, formats navigation data and forwards the data to monitor 112 for display as an annunciator on display 114.

Figure 2:
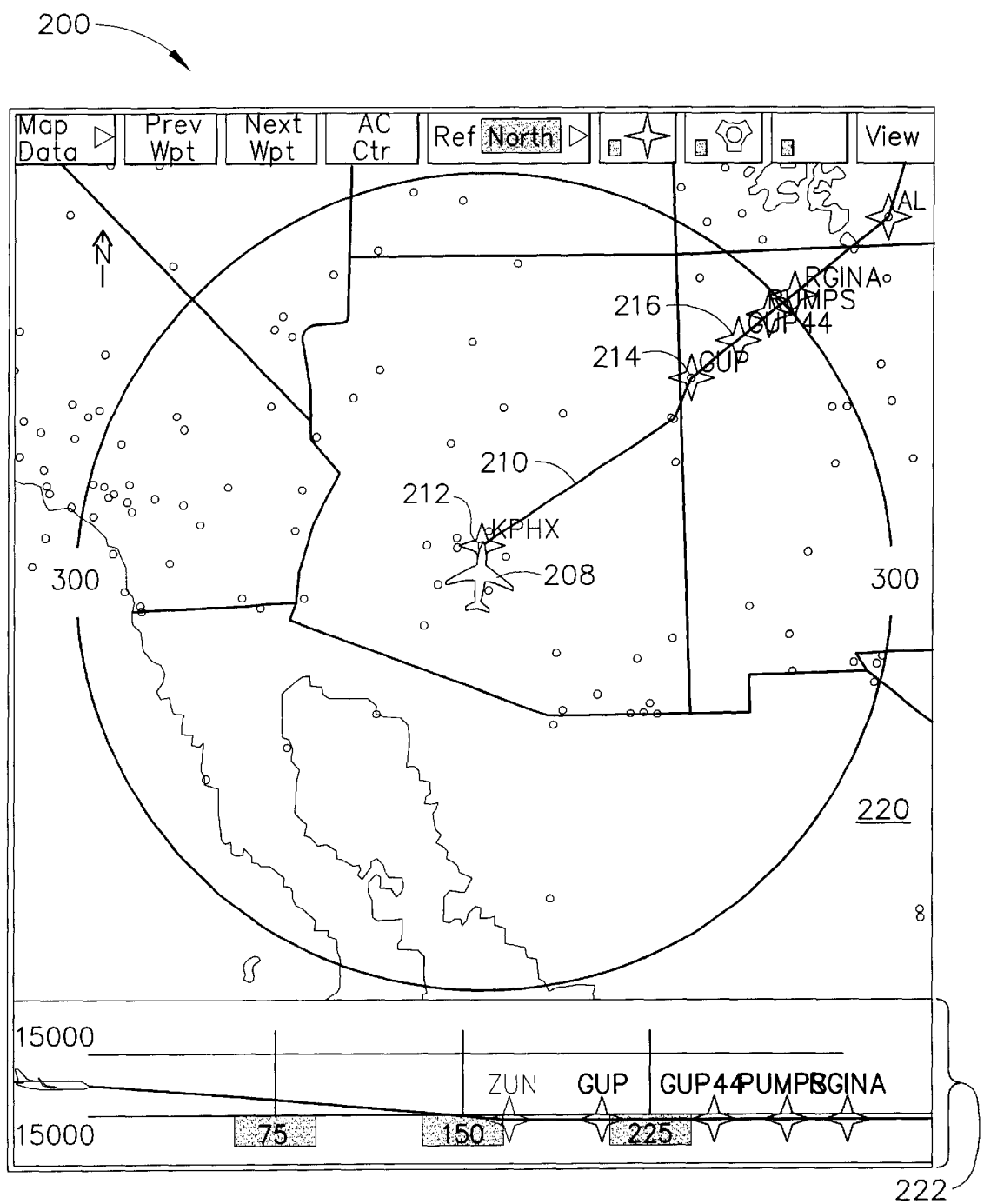
FIG. 2 is an exemplary multi-function display interface.

Monitor 112 may include any display monitor suitable for displaying the various symbols and information detailed below. Many currently known monitors are suitable for this task, including various CRT and flat-panel display systems. In an exemplary embodiment, display element 112 includes a multifunction display (MFD) 5, as shown in FIG. 2. Monitor 112 may be based on a panel mounted display, a HUD projection, or any known technology. In an exemplary embodiment, monitor 112 includes a large 14.1" diagonal display. Alternatively, monitor 112 may be implemented within an 8"×10" display or any other suitable display size.

Display 114 suitably includes various graphical elements associated with the lateral position, vertical position, flight-plan and/or other indicia of the aircraft's operational state of determined from avionics data 110 and of data sources 108. It will be appreciated that the pilot may modify the flight-plan and/or other such indicia graphically in accordance with feedback provided by display 114. In addition to the enhanced features and indicia described in more detail below, display 114 may include any number of conventional elements, e.g., visual indicators, alphanumeric text, lights, and the like. Display element 114 may receive a position signal (or signals) and generate a viewable image in response to the position signal. In this context, the position signal may be representative of position information that has been obtained and processed by processor 106.

Avionics data 110 includes standard information related to the state of the aircraft. Data sources 108 include various types of data used by the system, for example, flight plan data, data related to airways, navigational aids (Navaids), symbol textures, navigational data, obstructions, font textures, taxi registration, Special Use Airspace, political boundaries, COM frequencies (enroute and airports), approach info, and the like. Avionics data 110 may also be received by the aircraft via a conventional guidance system, gyroscope, global positioning system (GPS), inertial reference system (IRS) or the like.

FIG. 2 is an exemplary display 200 of a graphical flight-plan that may be shown as display 114 on monitor 112. With reference to FIG. 2, display 200 suitably includes an aircraft indicator 208 on a flight plan indicator 210, which shows the path to be flown by the aircraft. The flightplan may be marked by a series of waypoints such as waypoints 212, 214 and 216 on FIG. 2. Each waypoint may correspond to a navigational aid, an airport, or any other point on a map. The flightplan shown in FIG. 2, for example, shows the aircraft flying from waypoint KPHX 212 to waypoint ZUN 214, then turning toward waypoint GUP 216, and continuation to subsequent waypoints. Again, a typical flight plan may be represented as a series of flight segments from waypoint to waypoint, terminating at a destination airport. Changes to the flightplan, then, may be made by adding, removing or adjusting waypoints. Often this is accomplished with a flight management system (FMS), or through graphical manipulation of the waypoints on display 114 by pilot 102. Note that the upper portion 220 of display 114 shows a horizontal orientation of the flight plan, whereas lower portion 222 of display 114 shows a vertical orientation of the flight plan. In vertical orientation 222, aircraft elevation is more apparent, whereas latitude/longitude is ready apparent from horizontal orientation 220.

Figure 3:
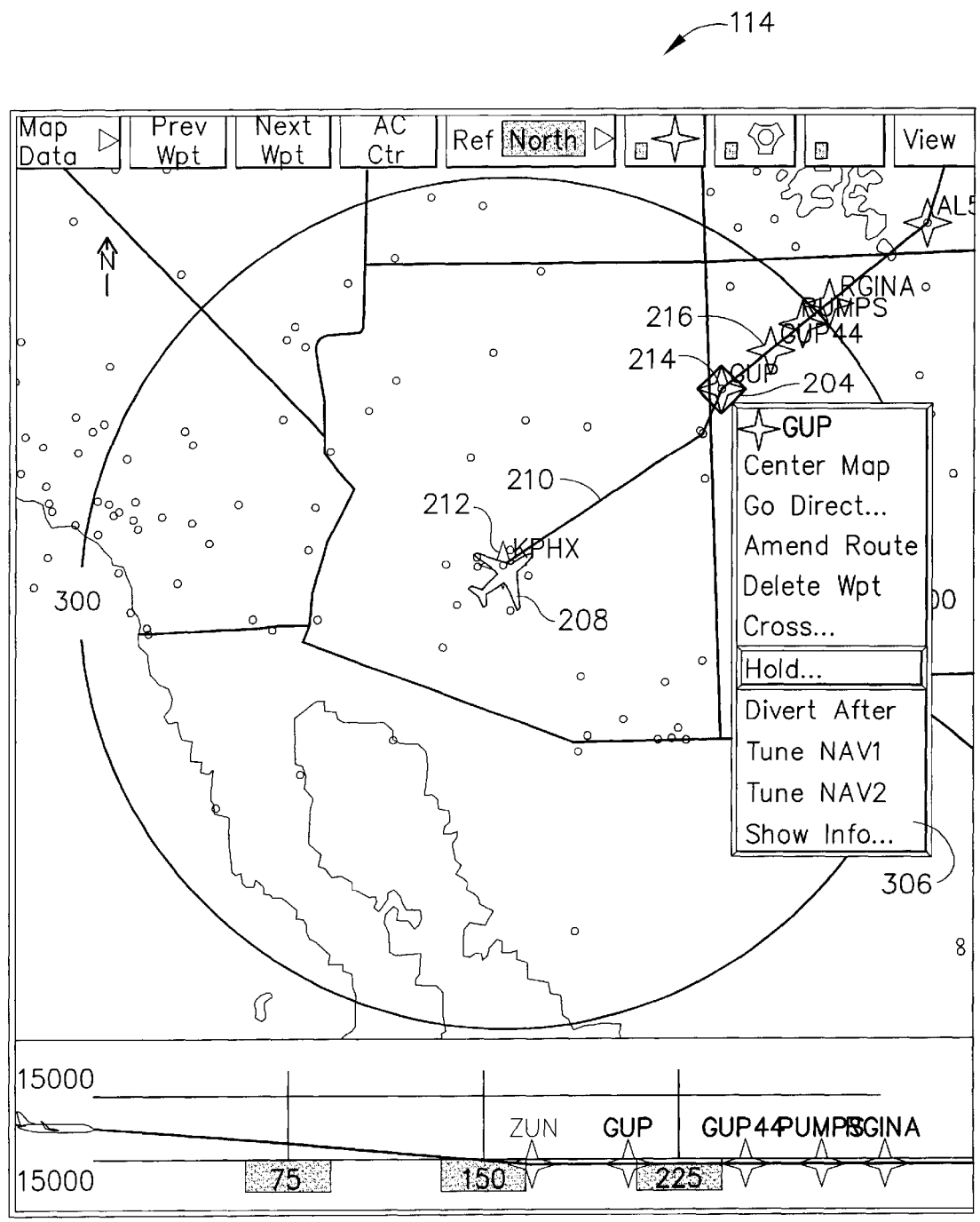
FIG. 3 is an exemplary multi-function display interface showing a pull-down menu associated with a waypoint.

With reference now to FIG. 3, pilots obtain further options relating to various waypoints by activating a waypoint options menu 306, which may be a pull-down window. Pilot 102 may activate menu 306 by pointing to the waypoint with cursor 204 in display 114 and clicking, for example. After the pilot activates the menu, a number of options are suitably presented to the pilot, who may choose an action associated with the particular waypoint. In the exemplary options menu 306 shown in FIG. 3, for example, pilot 102 is allowed to select "Center Map", "Go Direct . . . ", "Amend Route", "Delete (waypoint)", "Cross . . . ", "Hold . . . ", and the like. To select an option from the options menu 306, pilot 102 suitably indicates the desired option (by positioning the cursor over the option, by scrolling through the options with a button or knob, by depressing a key on a keypad, or the like) and activates the selection by depressing a button or otherwise indicating the desired option through input device 104 (FIG. 1). Of the options shown in exemplary menu 306, the four options "Go Direct . . . ", "Cross . . . ", "Hold . . . " and "Show Info" contain elipses to indicate that further information is available in the form of a dialog box. Of course the formatting of the particular menus 306 may vary widely from embodiment to embodiment. For example, different embodiments will use different fonts or formatting schemes, or may contain different options, formatting or wording. A number of exemplary options are discussed herein below, although of course other options may be added or deleted in various practical embodiments. After the pilot selects an option, a dialog box may be presented on display 114 to provide additional detail about the selected option, or to obtain additional information about the selection.

Figure 4A:
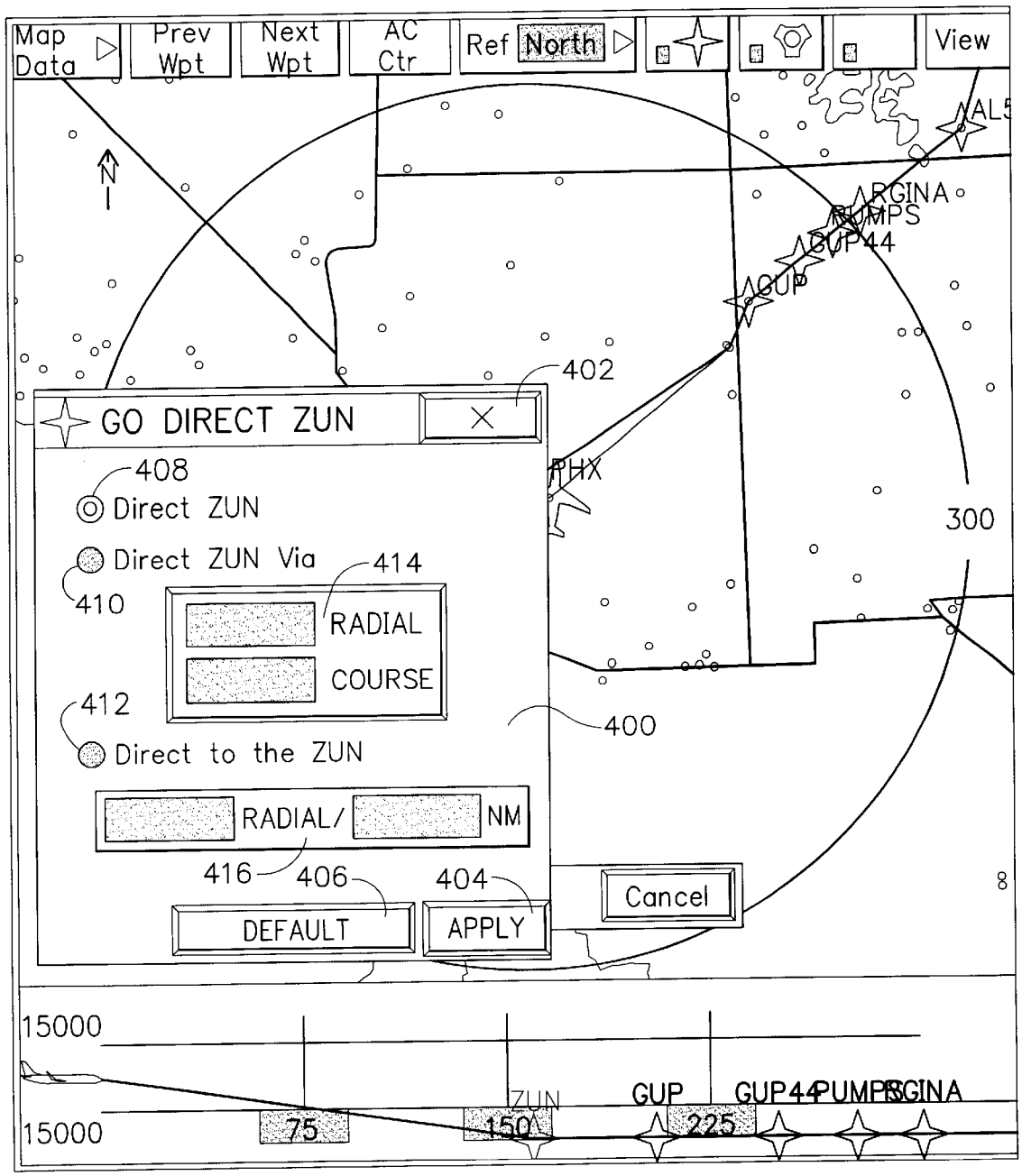
FIG. 4A is an exemplary multi-function display interface including a "Go Direct" dialog box.
Figure 4B:
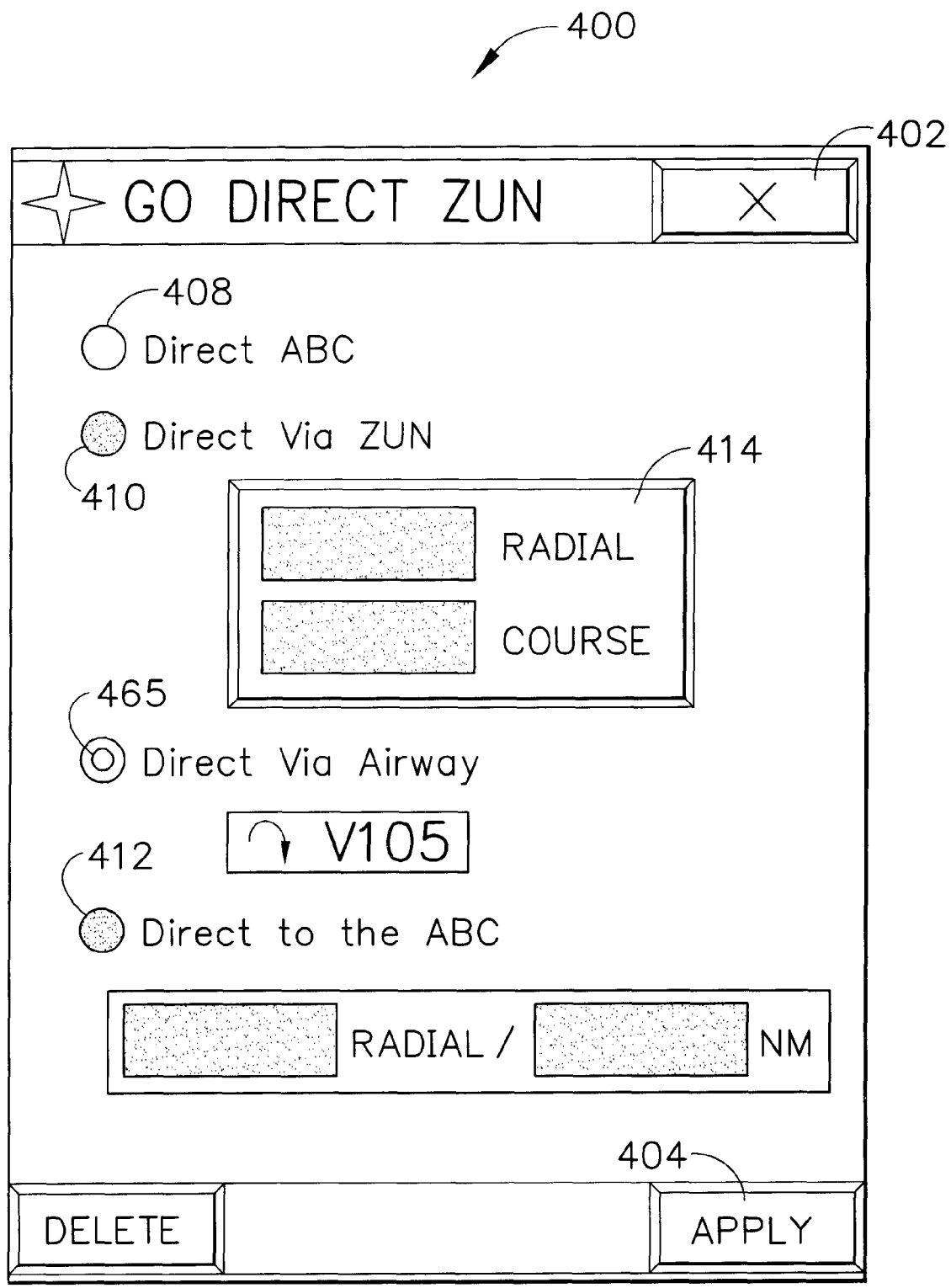
FIG. 4B is an exemplary "Go Direct" dialog box.

FIGS. 4A and 4B show exemplary dialog boxes 400 for a "Go Direct . . . "task. With reference now to FIG. 4, an exemplary "Direct" dialog box 400 suitably includes radio buttons 408, 410 and 412 for selecting a direct course to the waypoint, a direct course via a desired radial or heading, or direct to a particular radial for the waypoint, respectively. Dialog box 400 also includes a "cancel" button 402 that may be selected at any time, a "default" button 406 to obtain default settings that may be stored in a database, in the FMS, or elsewhere, and an "apply" button 404 for accepting the data input in dialog box 400. Note that "Cancel" button 402 may be in addition to other Cancel buttons that relate to other display functions, such as the cancel button shown in FIG. 4 under dialog box 400. If the pilot selects the "Direct to Waypoint Via" option, window 414 becomes active, as appropriate, and the pilot is prompted to enter a desired radial or course heading for the desired approach to the waypoint. Similarly, window 416 becomes active if the pilot selects the "Direct to the Waypoint" option for flying directly to a desired radial from the waypoint at a desired distance from the waypoint. Of course other embodiments may use different wording, formatting, and the like for the various equivalent options. FIG. 4B, for example, includes an additional airway dialog box 465 for selecting an approach to a waypoint via an airway. Information about airways that are known to intersect a particular waypoint may be retrieved from a navigation database or other appropriate source.

In an exemplary embodiment, the layout and language of dialog box 400 closely correlates to terminology used by air traffic control. For example, if instructions from air traffic control are "Proceed direct ZUN", pilot 102 may select radio button 408. If ATC directs "Proceed direct via ZUN 090 radial", pilot 102 may select radio button 410 and enter "090" in the "radial" entry on box 414. Similarly, if ATC instructions are "Fly direct to the ZUN 270, 25 fix", pilot 102 may select radio button 412 and enter "270" and "25" into the "radial" and "NM (nautical mile)" entries in box 416, as appropriate. In various embodiments, as a pilot places the cursor on the "radial" box, the most direct radial from the current position of the aircraft to the waypoint may be displayed. A pilot may then "fine tune" the radial with a knob or keyboard to a desired setting, as appropriate.

Figure 5A:
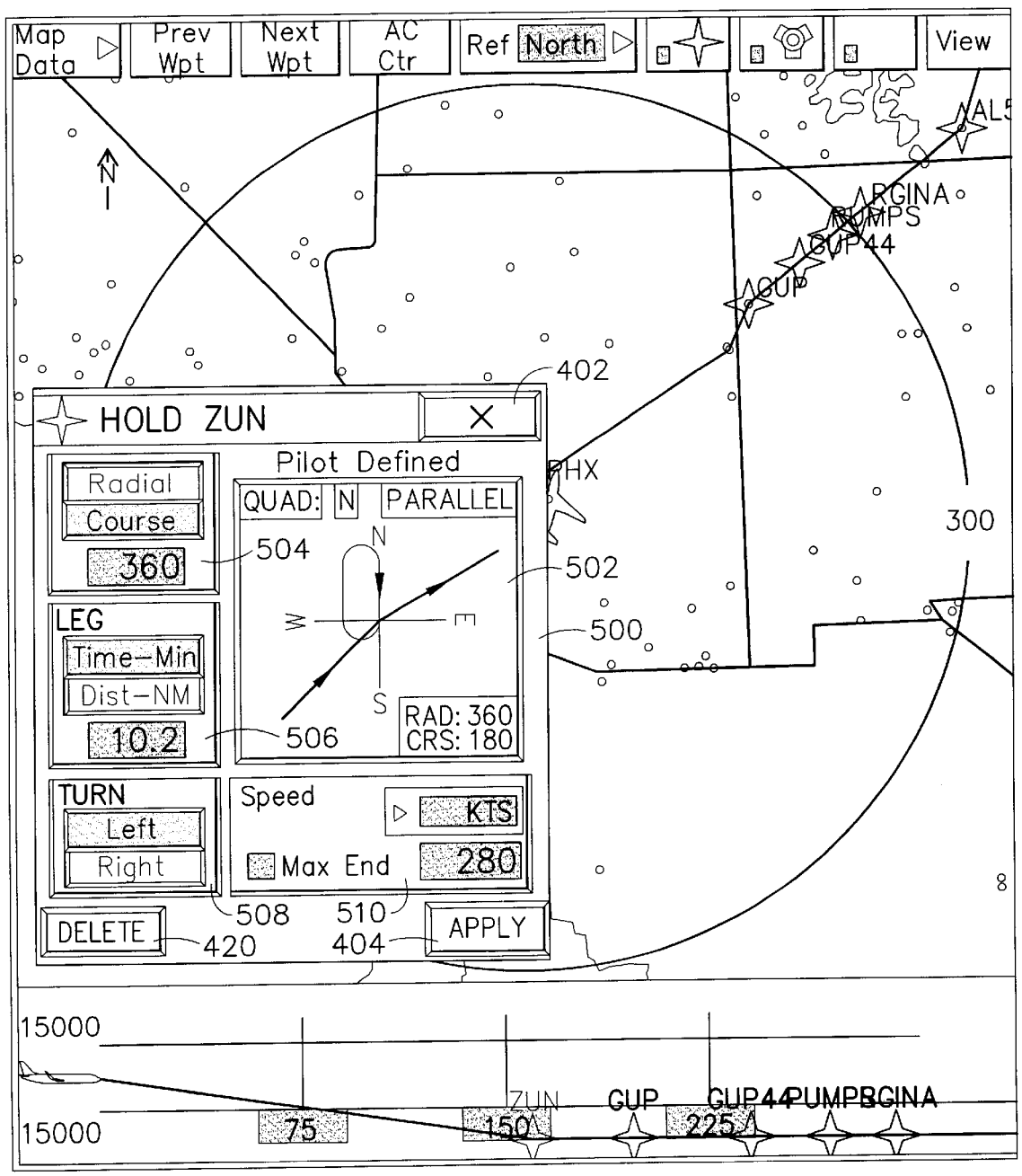
FIGS. 5A and 5B are exemplary multi-function display interfaces including a "Hold" dialog box.
Figure 5B:
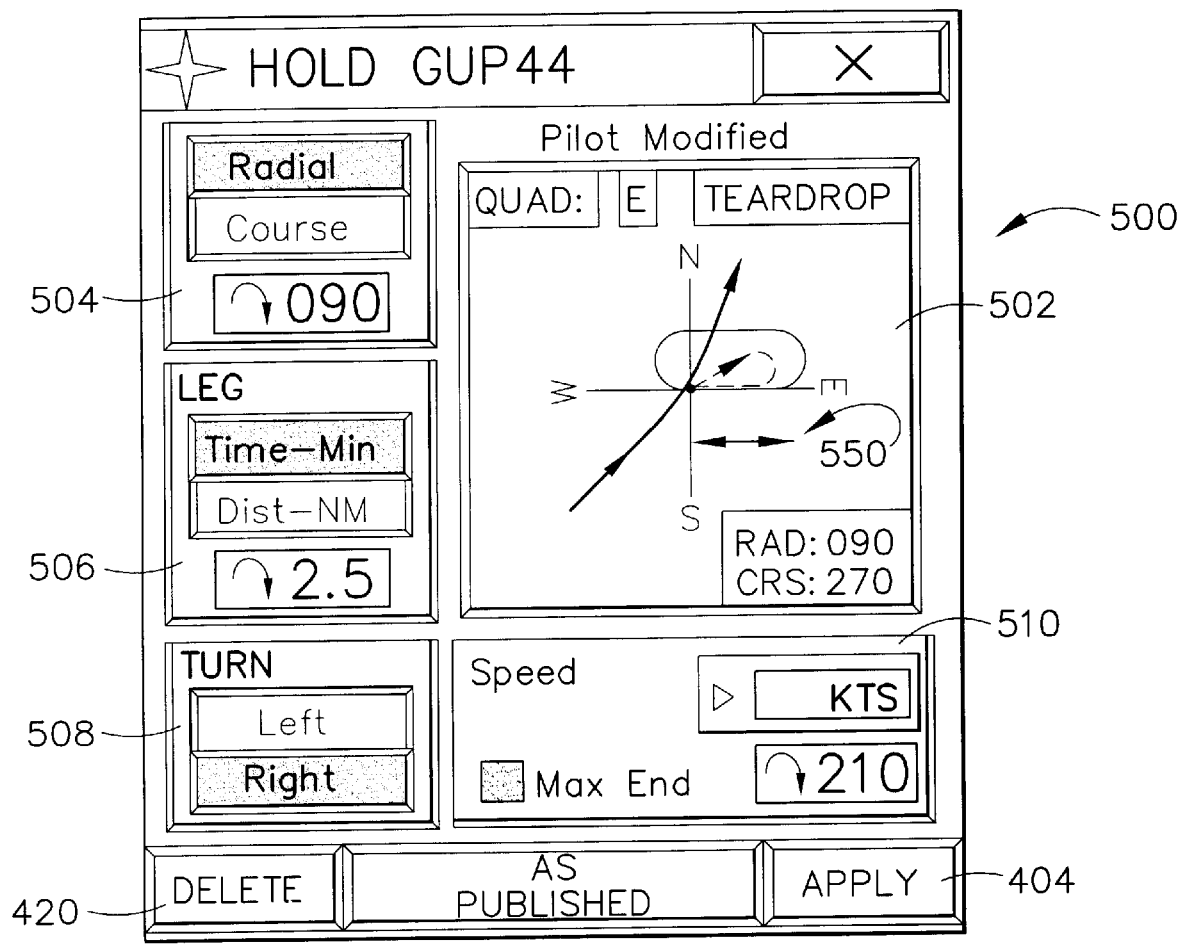

FIGS. 5A and 5B show exemplary dialog boxes 500 for a hold pattern about a waypoint "ZUN". With reference now to FIG. 5A, an exemplary "hold"dialog box suitably includes a cancel button 402, an "apply" button 404, and a "delete" button 420. As with the buttons in the "Direct to" dialog box, buttons 402 and 404 suitably cancel or apply (respectively) the changes made by pilot 102 since opening box 500. Delete button 420 suitably deletes the changes entered by the pilot but does not close dialog box 500, as the cancel button 402 does. An optional "As published" button (not shown) may also be present to retrieve hold information related to the waypoint from a navigation database or other appropriate source. In such embodiments, the words "Pilot Defined" shown in FIG. 4 may be changed to "As published" or a similar phrase when published information is used or displayed in dialog box 400.

To define a holding pattern about a waypoint, pilot 102 suitably selects an outbound radial from the waypoint or a course heading in box 504, a leg time or distance in box 506, a "left" or "right" turning scheme in box 508, and a desired airspeed in box 510. Although the values shown in FIG. 5 relate to conventional aviation units used in the United States (e.g. knots, nautical miles, and the like), it will of course be appreciated that these units could be converted or displayed using any system of measurements, including, e.g., System International (SI) units. Airspeed, for example, could be displayed in knots, kilometers/second, mach, or any other unit. In an exemplary embodiment, the system of measurement is configurable by pilot 102, as appropriate and desired.

In various embodiments of dialog box 500, a graphical display 502 is provided that shows a graphical layout of the holding pattern defined in boxes 504, 506, 508 and 510. This pattern may change as pilot 102 changes the inputs in the relevant boxes to provide a graphical rendering of the holding pattern being entered. This graphical display 502 suitably allows the pilot to review a holding pattern before clicking on the "accept" button 404 so that the pilot is made more conceptually aware of the pattern being flown by the aircraft. In various embodiments, graphical display 502 is sensitive to pilot input such that the pilot is allowed to suitably adjust the course or radial flown in response to input from pilot 102 via a mouse, keyboard, knob, or the like. In such embodiments, alternate courses may be displayed in graphical display 502 in response to commands from pilot 102. The pilot then selects a desired course when the course appears in the display 502, as appropriate. Courses may also be selected by clicking in a quadrant of grapical display 502 to select a quadrant (e.g. north, south, east, west) for the holding pattern. After a quadrant is selected, a pilot may be allowed to fine tune a desired radial using the selected quadrant setting (e.g. 0 degrees, 180 degrees, 90 degrees, 270 degrees for north, south, east and west, respectively) as starting points. As changes are being made to the graphical display 502 (corresponding to changes in potential holding patterns), the patterns may be displayed in dashed lines, in a separate color, or in any other manner that distinguishes the "potential" courses from actual courses selected. Additionally or alternatively, the parameter being adjusted by pilot 102 may be highlighted in the graphical display 502 by a parameter marker such as arrow 550 in FIG. 5B. In such embodiments, the parameter marker appears when a parameter in any of the dialog boxes are being adjusted, and disappears from the graphical display when the parameter is selected by pilot 102. Parameter markers may be arrows, lines, colors, shapes, or any other indicators.

The layout and content of boxes 504, 506, 508 and 510 may vary from embodiment to embodiment, but in an exemplary embodiment (such as that shown in FIG. 5) the boxes are selected to correspond to conventional ATC language. For example, the information shown in the exemplary dialog box 500 in FIG. 5 corresponds to "Hold north of ZUN on 360 radial, 10.2 mile leg, right turns." Although not shown in FIG. 5, alternate embodiments include a box for entering a time that further instructions from air traffic control might be expected. When this time is reached, an indicator, alarm or other reminder may be provided to pilot 102. Still other embodiments may include spaces or boxes for aircraft altitude information. Such embodiments may, for example, allow the pilot to select a desired altitude and to maintain that altitude during the hold pattern.

Figure 6A:
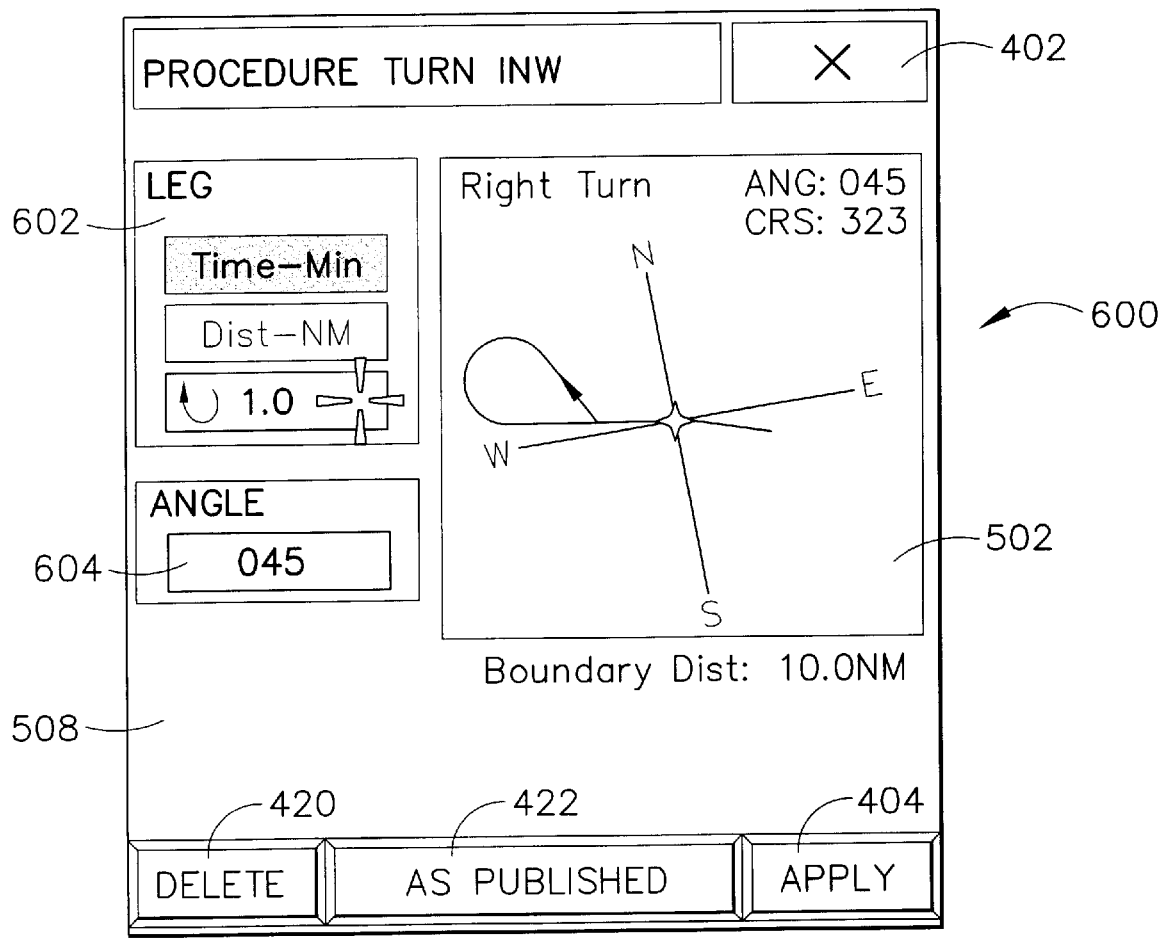
FIGS. 6A, 6B and 6C are exemplary "Procedure Turn" dialog boxes.
Figure 6B:
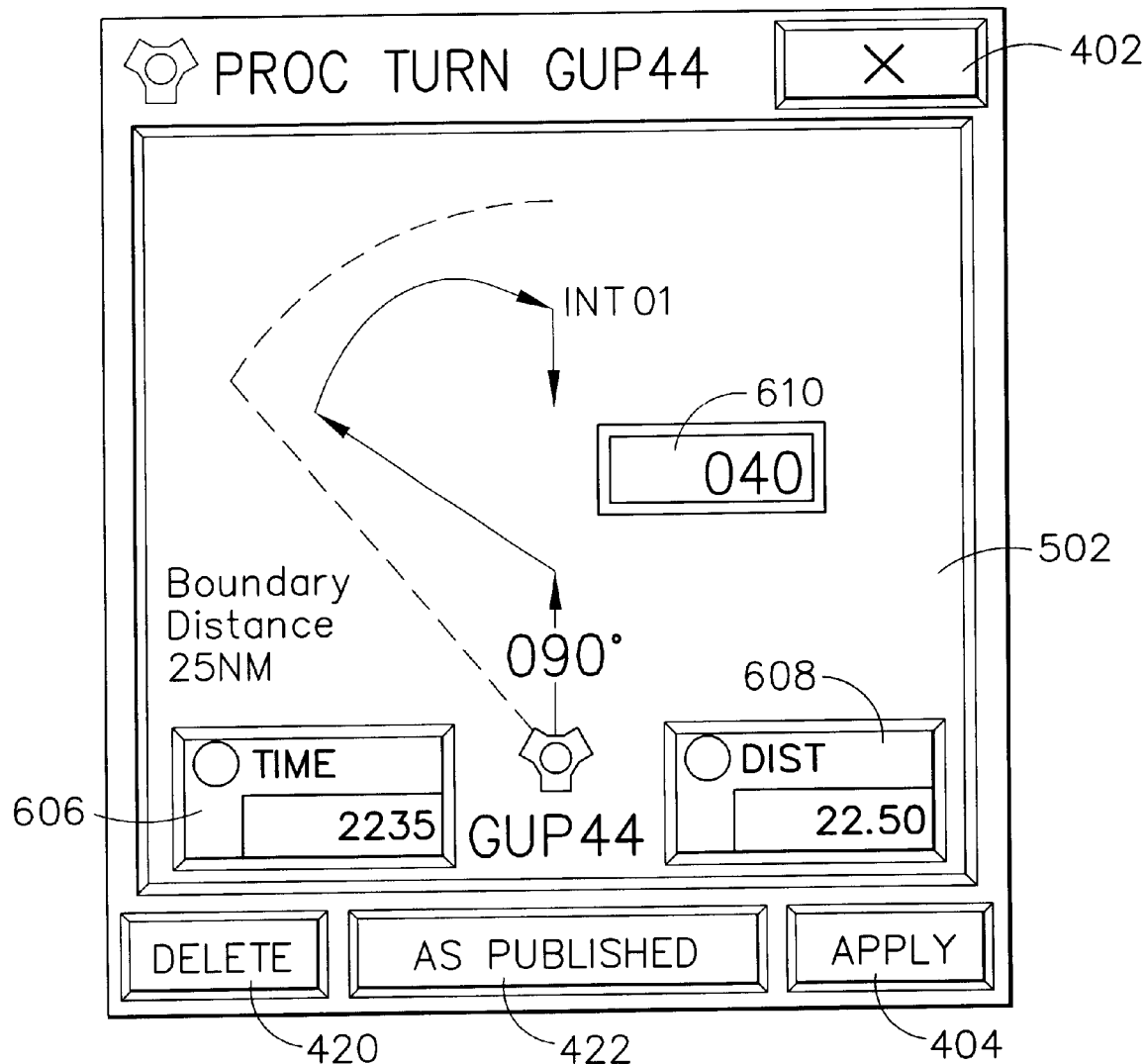
Figure 6C:
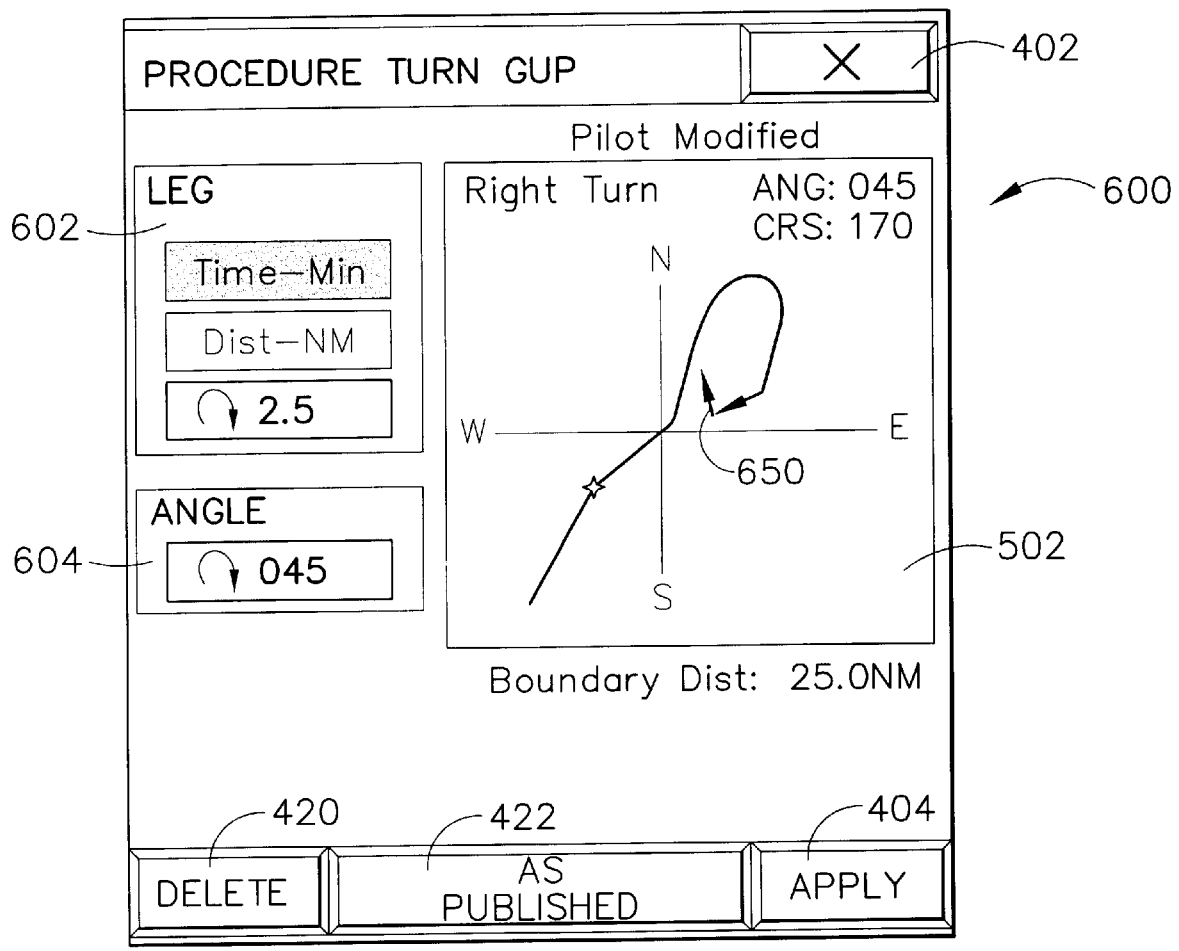

FIGS. 6A, 6B and 6C show exemplary embodiments of dialog boxes 600 associated with making procedure turns, such as those associated with approaches to runways or airports. Data about the particular procedure turn to be executed may be obtained from a navigation database 108 (FIG. 1) or from any other data source. With reference to FIG. 6A, an exemplary procedure turn dialog box 600 suitably includes a time/distance input box 602 for the outbound leg of the turn and angle input box 604 for the desired turn angle. Boundaries of procedure turns are typically defined from published sources, and may be retrieved from the navigation database and displayed on graphical display 502 as appropriate. A pilot may configure dialog box 600 for a published procedure turn by simply clicking on button 422, which suitably retrieves the appropriate data from the navigation database. A graphical display window 502 suitably plots the aircraft's path through the turn and provides a graphical display of the turn to pilot 102. Graphical display window 502 may also display course heading data for the aircraft, as shown in FIG. 6A.

With reference now to FIG. 6B, an alternate embodiment of a procedure turn dialog box 600 suitably includes a time window 606, a distance window 608 and a course angle window 610 within graphical display window 502. According to this embodiment, the turn may be configured according to published data (by pressing button 422), by entering a time to execute the turn in window 606, or by entering an appropriate distance and turn angle in windows 608 and 610, respectively. Of course many other embodiments that show the path of the aircraft as it executes the turn could be formulated, with many different schemes for obtaining input parameters. Alternate embodiments of procedure turn dialog box 600 may include spaces or boxes for aircraft altitude information. Such embodiments may for example, allow the pilot to select a desired altitude and to maintain that altitude during the turn, or to select a desired beginning and/or ending altitude. Still further embodiments may allow pilots to view potential procedure turn angles or leg distances graphically in graphical display 502 as the parameters are being modified. FIG. 6C, for example, shows a procedure turn dialog box 600 that includes an arrow 650 that suitably rotates as pilot 102 adjusts the value for the turn angle in box 604.

Figure 7A:
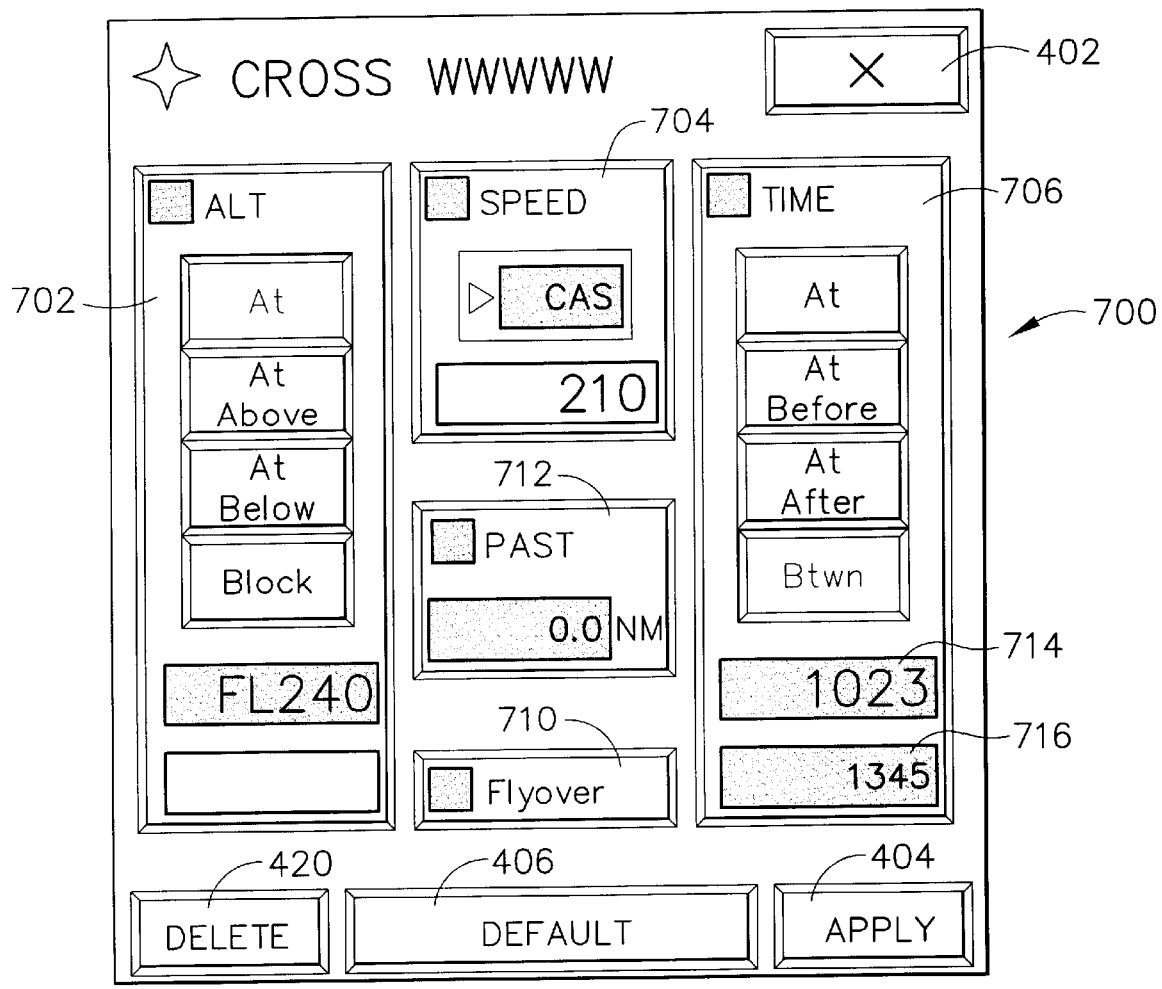
FIGS. 7A, 7B and 7C are exemplary "Cross" dialog boxes.
Figure 7B:
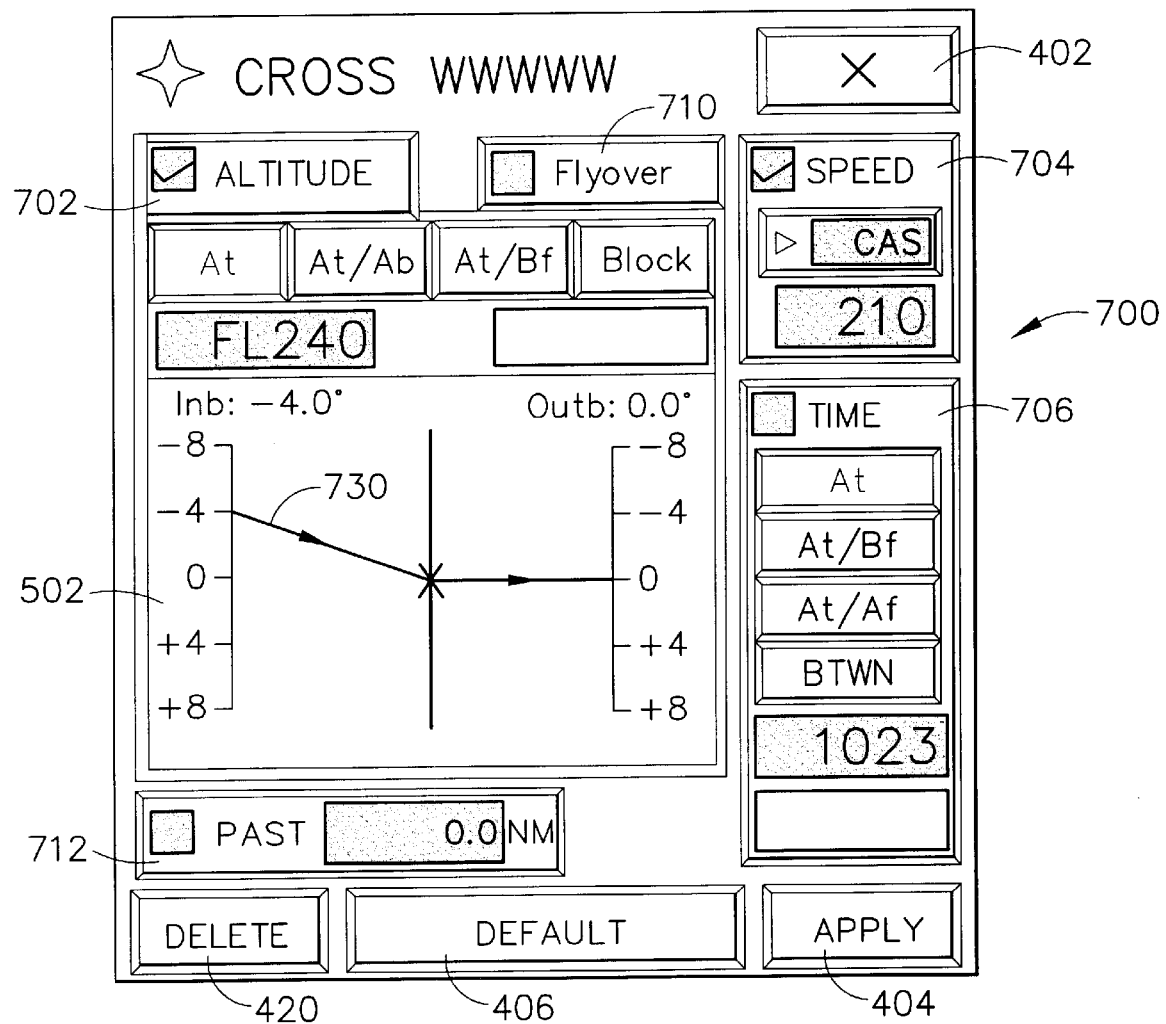
Figure 7C:
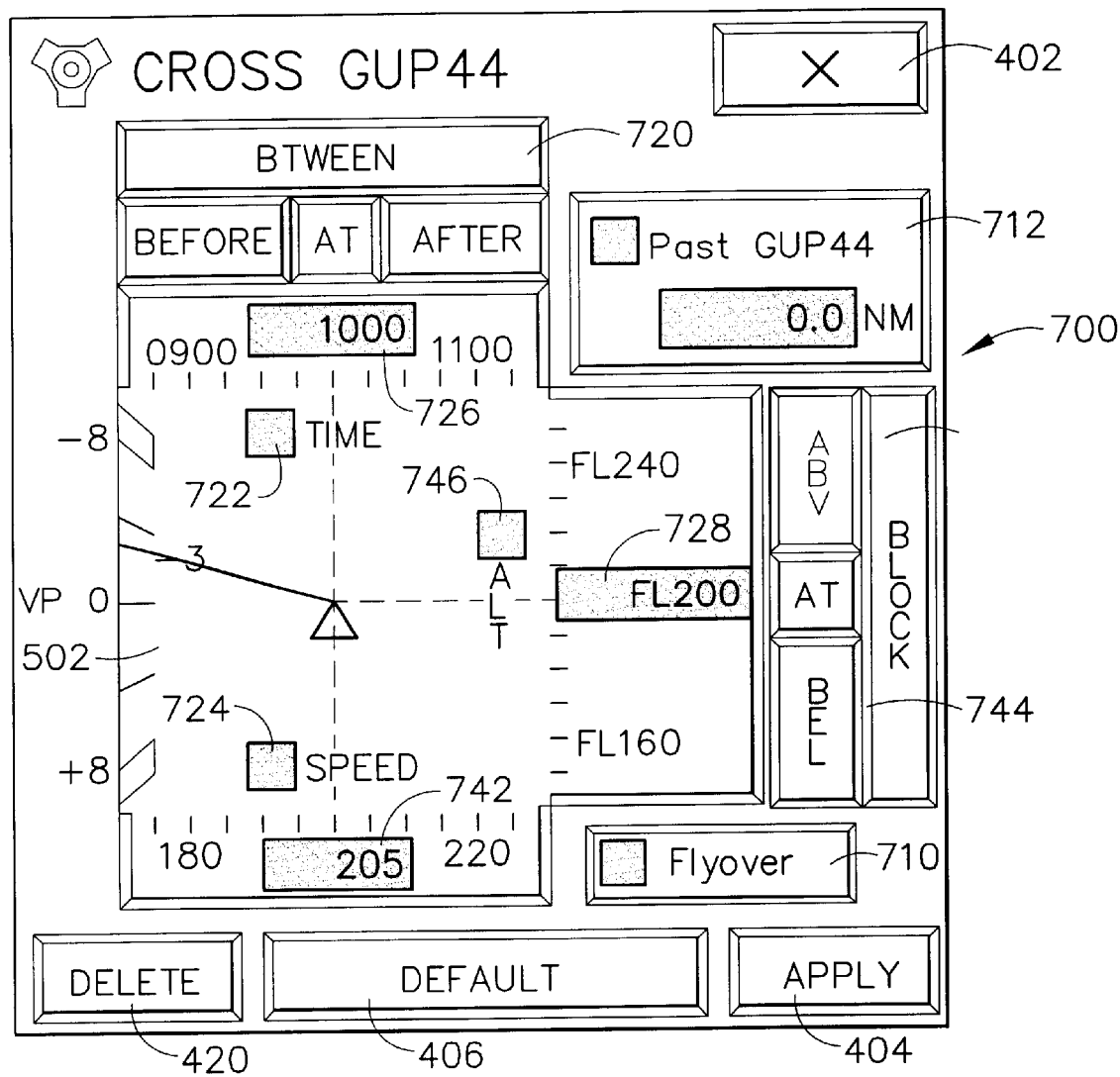

With reference now to FIGS. 7A–7C, exemplary embodiments of a "cross" dialog box 700 are shown. Such dialog boxes may become useful when ATC instructs a pilot to cross a waypoint at a given altitude, time and/or airspeed. The boxes shown also include an optional "flyover" selection 710, corresponding to an actual flyover of the waypoint (as opposed to "cutting comers" of a turn).

With reference now to FIG. 7A, an exemplary "cross" dialog box 700 suitably includes entries for altitude data 702, speed data 704, and time data 706 as well as a flyover checkbox 710. Conventional cancel, delete, default and apply buttons 402, 420, 406 and 404, respectively, may also be provided as described above. An "as published" button that is configured to retrieve published information from a navigation database may also be provided. Altitude data box 702 suitably allows for entry of an altitude (shown as "FL240", or 24,000 feet in FIG. 7A) by pilot 102, as well as selection of crossing the waypoint "at", "at or above", "at or below" that altitude. Exemplary embodiments also include "block" functionality, which allows pilot 102 to define a maximum and a minimum altitude at which to cross the waypoint. Speed data box 704 suitably allows pilot 102 to enter a desired airspeed for executing the 'cross' manueuver, or a desired airspeed for the aircraft when crossing the waypoint. Time data box 706 suitably allows a pilot to select crossing the waypoint "at" a given time, at or "before" that time, "at or after" that time, or "between" to given periods of time. Text entry boxes 714 and 716 accept pilot input time (in local time, Zulu time, coordinated universal time, or any other appropriate time format), as appropriate. In various embodiments, box 716 is suitably grayed out or otherwise inactivated until the pilot 102 selects the "between" option in box 706. A "flyover" checkbox 710 may be provided to prevent "cutting corners" during turns, as well as a "fly past" box 712 that allows the pilot 102 to define a distance past the waypoint that he/she would like to fly. The settings shown in FIG. 7A correspond to an ATC instruction of "Cross WWWW at FL 240 at 210 knots between 1023 and 1345 Zulu."

With reference now to FIG. 7B, an alternate embodiment of "cross" dialog box 700 suitably includes text entry boxes 702, 704, 706, 710 and 712 for altitude, speed, time, flyover and fly past, respectively, as described above. A graphical display 502 may also be provided. Graphical display 502 suitably provides a vertical perspective of the aircraft altitude approaching and departing from the waypoint, as appropriate. In the exemplary embodiment shown in FIG. 7B, graphical display 502 shows the pilot approaching the waypoint at a 4 degree decent to FL240, then continuing on from the waypoint in level flight. The line 730 approaching the waypoint may be adjusted according to the selection made in altitude selection box 702. For example, if pilot 102 selects "at or above" a given flight level, the line 730 may be replaced or supplemented with a shaded region indicating that altitudes above line 730 are also acceptable. Similarly, the region below line 730 may be shaded when the "at or below" option is set in box 702, or a blocked out region may be shaded corresponding to the "block" option. The exemplary dialog box 700 shown in FIGS. 7B corresponds to an ATC instruction of "Cross WWWW at FL240 and 210 knots at 1023 Zulu."With reference now to FIG. 7C, a third exemplary embodiment of a cross dialog box 700 suitably includes delete, default, cancel and apply buttons 420, 406, 402 and 404 as described above, as well as flyover and fly past checkboxes 710 and 712. Options for flying over the waypoint in the embodiment shown are selected by activating or deactivating radio buttons 722, 724, and 746 corresponding to time, speed and altitude, respectively. If any of these buttons are checked, relevant data may be input into time box 722, speed box 742, and/or altitude box 728, as appropriate. Time options such as "at", "before", "after" or "between" may be selected using buttons 720. Altitude options such as "above", "at", "below", and "block" may be selected using buttons 744. As shown in FIG. 7C, graphical display 502 suitably includes sliding scales for time, speed and altitude to further enhance the amount of information made available to pilot 102.

Figure 8A:
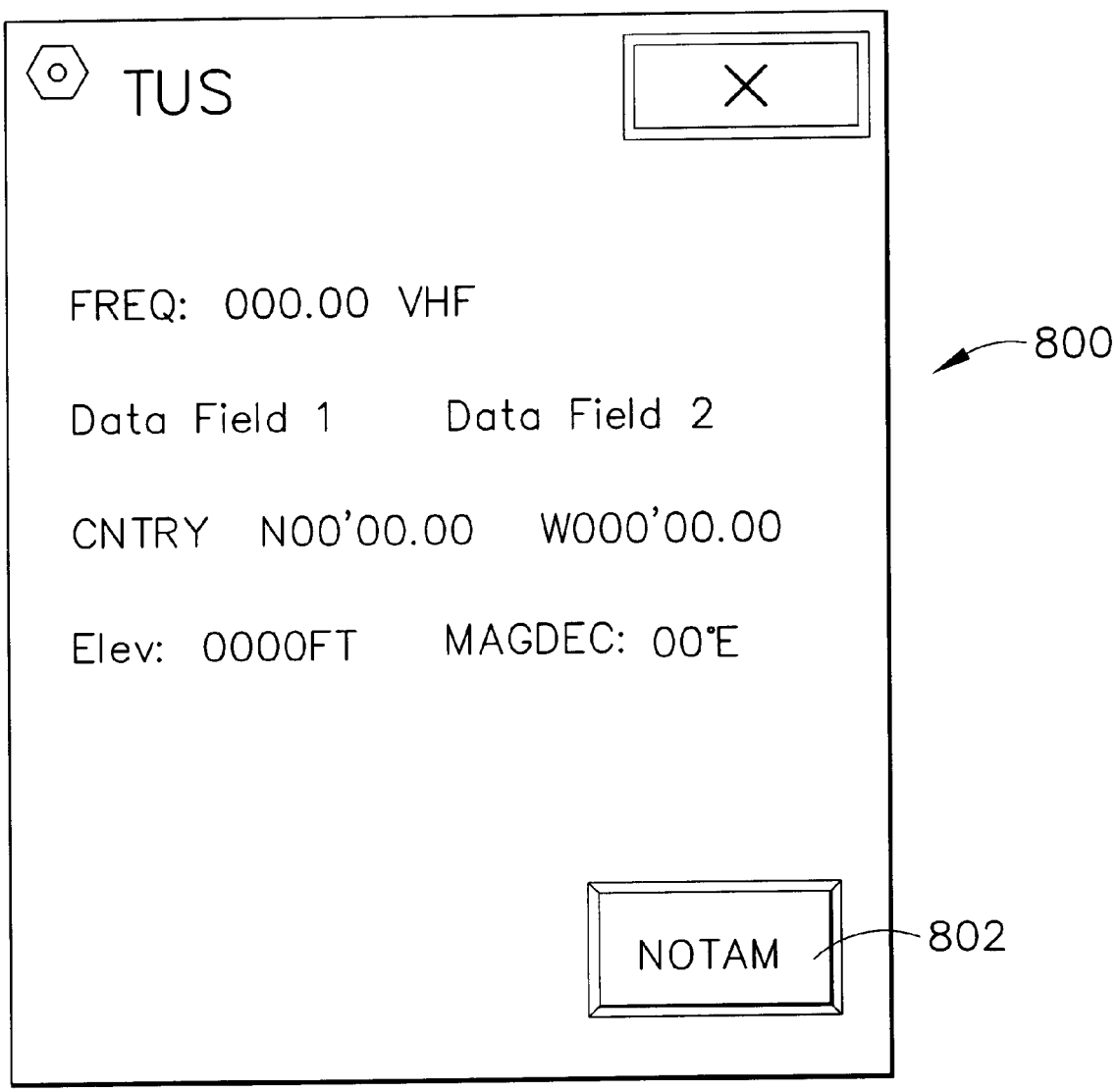
FIGS. 8A, 8B and 8C are exemplary "Show Info" dialog boxes.
Figure 8B:
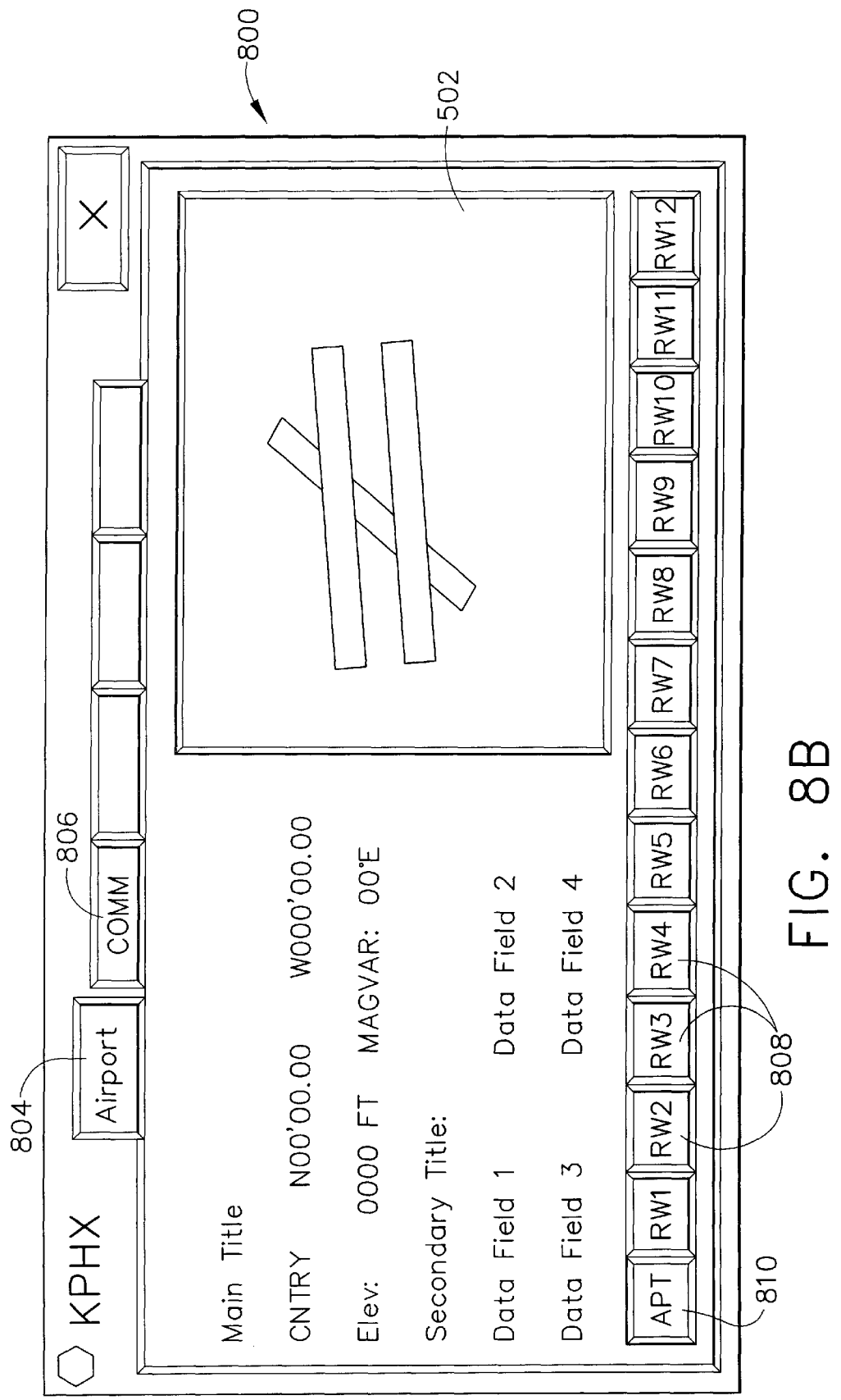
Figure 8C:
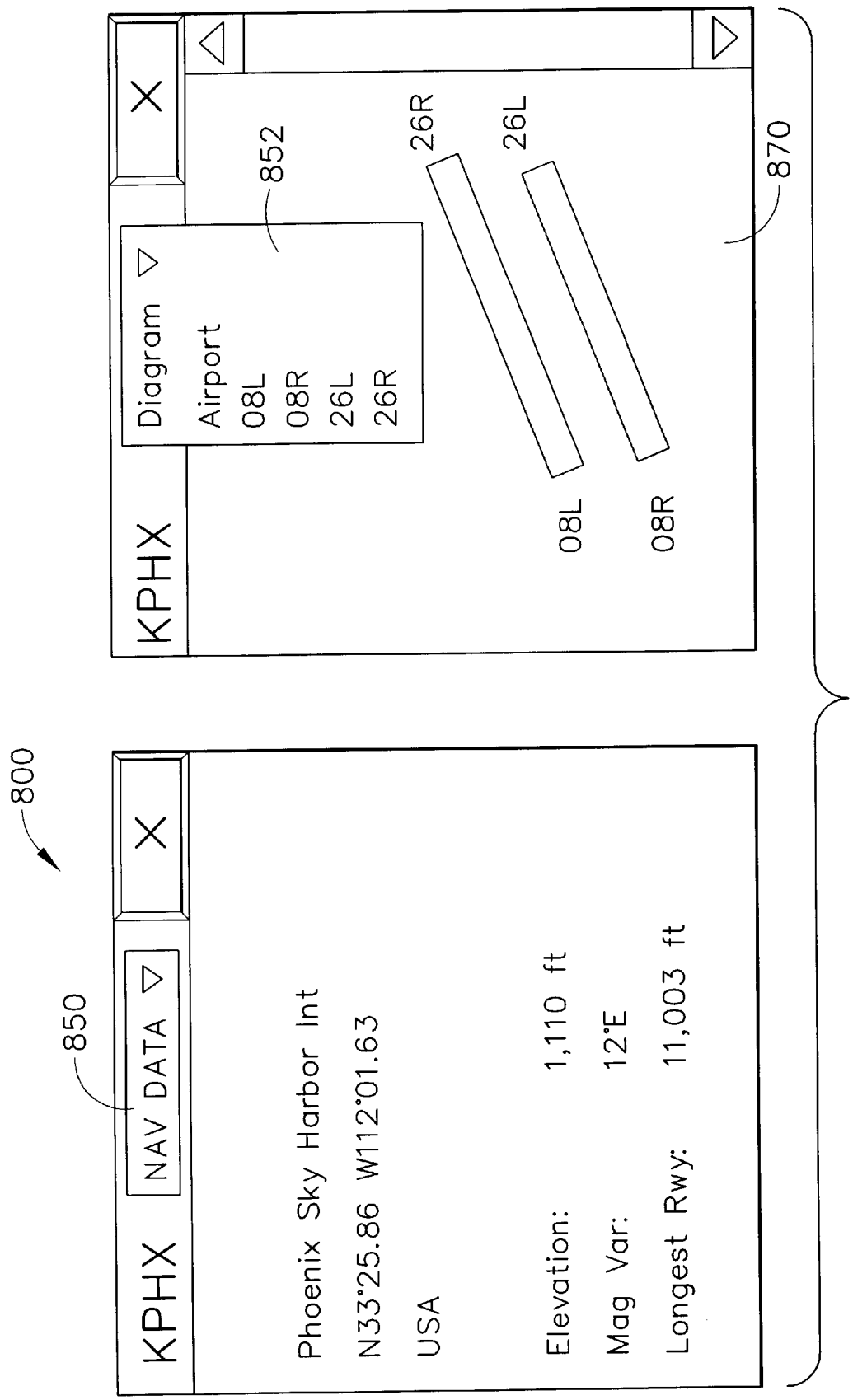

With reference now to FIGS. 8A, 8B and 8C, "show info" dialog boxes 800 suitably provide information about a waypoint, airport or the like to pilot 102. FIG. 8A is an exemplary show info dialog box 800 for a waypoint. As shown in the Figure, information displayed may include radio frequency information, latitude, longitude, altitude, magnetic declination, and the like. Additional buttons such as button 802 may be activated to obtain additional information, such as NOTAM information, navigation information, or the like. With reference to FIG. 8B, an exemplary show info dialog box 800 for an airport suitably includes location information as appropriate, as well as a graphical display 502 that shows a graphical layout of the airport. Buttons 808 and 810 may be depressed to obtain alternate views on graphical display 502. Individual runways may be shown by depressing appropriate buttons 808, for example, or a layout map of the entire airport may be shown by depressing button 810. Tabs 804, 806 and the like suitably provide additional pages for additional information about the airport. Tab 806 may provide information about communications frequencies in use at the airport, for example, and additional tabs may provide information relating to hotel or rental car availability, fuel service availability, additional services available at the airport, or any other information.

An alternate embodiment of a "show info" dialog box 800 is shown in FIG. 8C. Instead of buttons for selecting various forms of information about an airport or other point of interest, pilot 102 simply selects information desired from a pull-down menu 850. Selection of an option from pull-down menu 850 may alter the display of dialog box 800, as appropriate, or may initiate opening of another dialog box such as box 870. Box 870 as shown in FIG. 8C includes information about runways, with a pull-down menu 852 that is suitably configurable to allow the pilot to view all runways (e.g. "airport") or a particular runway. Of course many formats and styles of displaying and presenting information may be used in various alternate embodiments.

Figure 9:
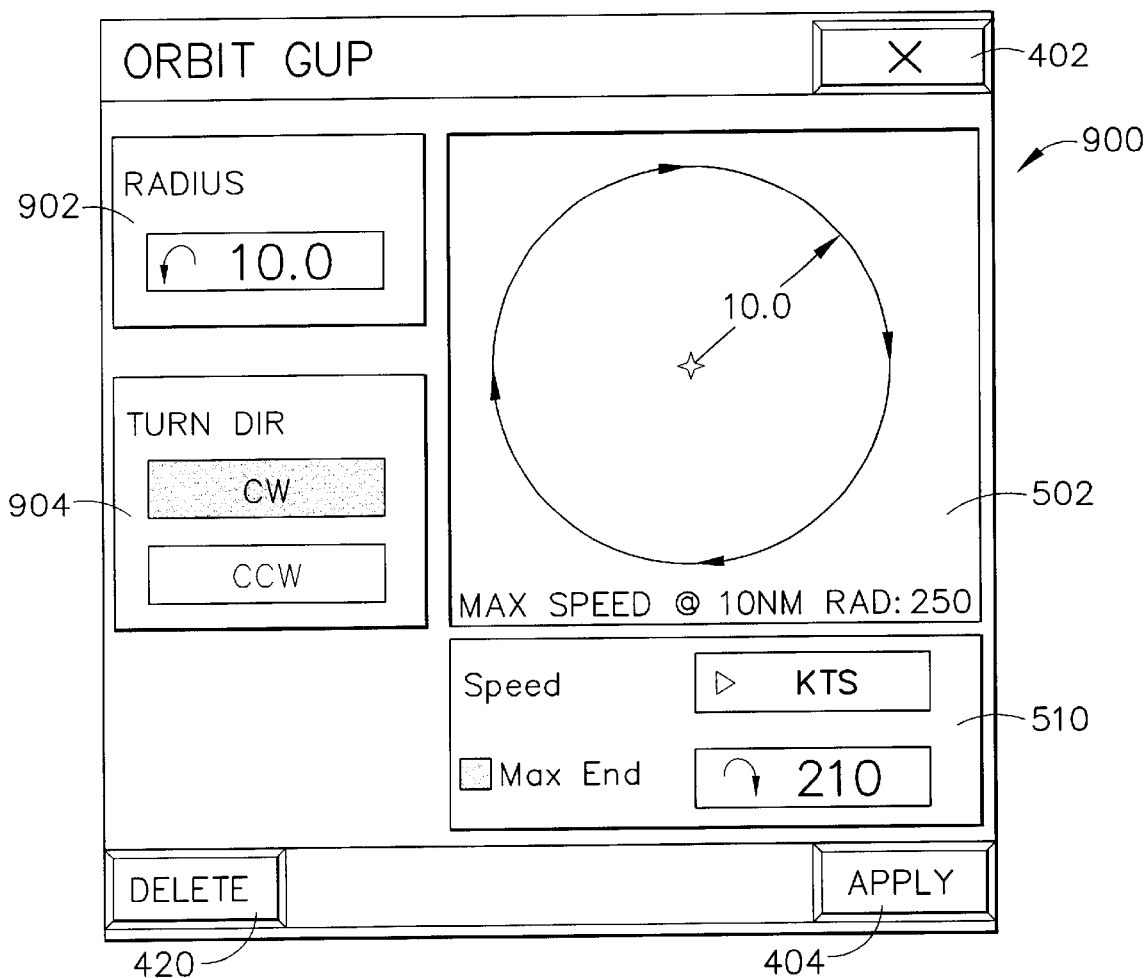
FIG. 9 is an exemplary "Orbit" dialog box.

With respect to FIG. 9, an exemplary orbit dialog box 900 suitably allows a pilot to configure a circular or elliptical orbit around a selected waypoint. Although this functionality is not typically instructed by ATC, it is useful in search and rescue operations, for example, where flying a continuous pattern around a single point would aid search efforts. To configure an orbit pattern for the aircraft, pilot 102 suitably defines an orbit radius in radius box 902 and a direction to orbit (e.g. clockwise or counterclockwise) in direction box 904. Airspeed may also be configured in speed box 510. The path of the orbit about the waypoint may be shown graphically in graphical display 502.

Figure 10:
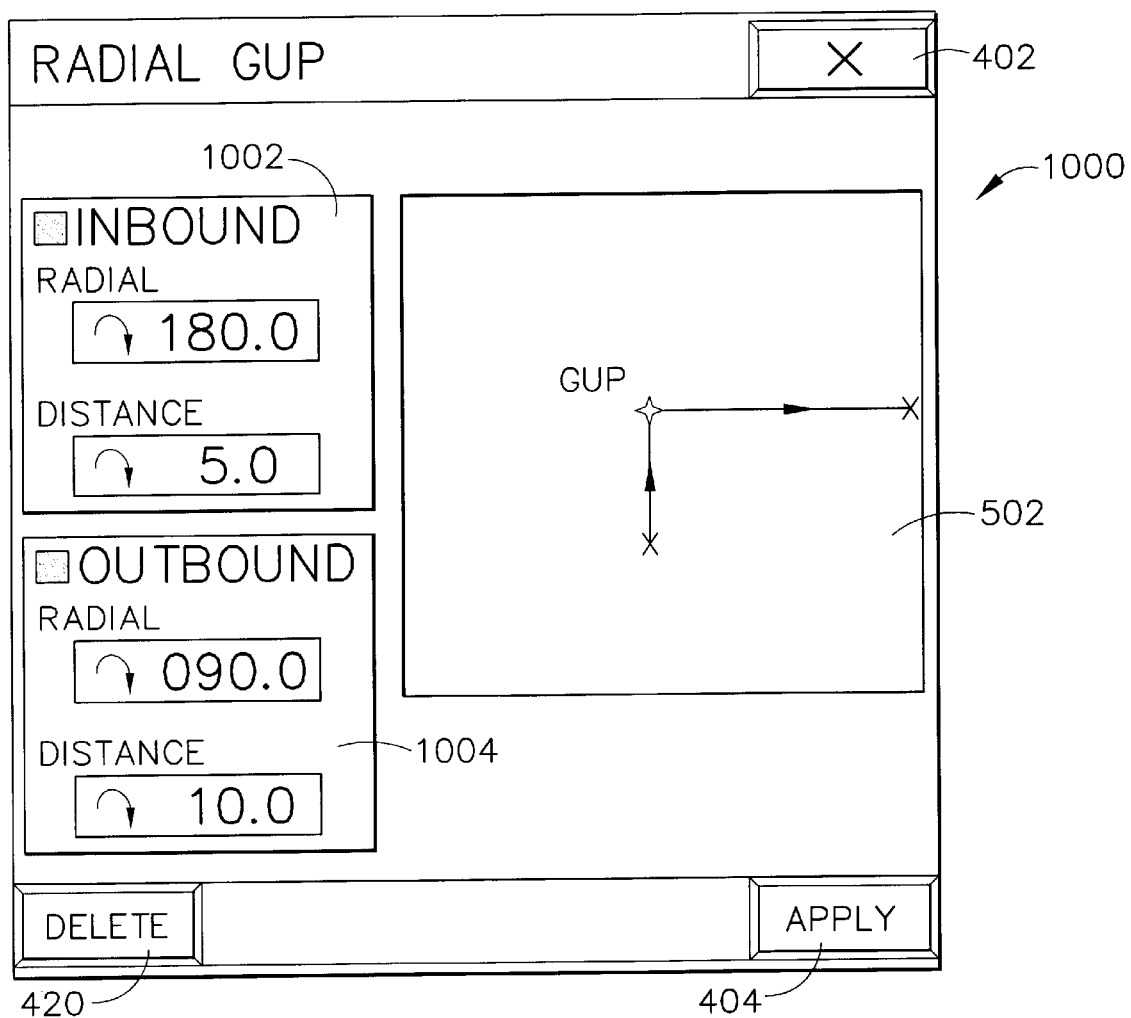
FIG. 10 is an exemplary "Radial" dialog box.

With respect to FIG. 10, an exemplary radial dialog box 1000 suitably allows pilot 102 to define a path toward and/or away from a waypoint. To achieve this end, radial dialog box suitably includes boxes 1002 and 1004 corresponding to inbound and outbound radials (respectively) for the aircraft to follow while approaching/departing from a waypoint. The configured path of the aircraft may be shown in graphical display 502. Distances (in nautical miles, kilometers, or any other appropriate unit of measure) may also be configurable in various embodiments.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A method of controlling an aircraft comprising the steps of:
   inputting a flightplan into a computer, wherein said flightplan comprises a series of waypoints displayed on a graphical display;
   selecting one of said series of waypoints from said graphical display to obtain a menu of options relating to said waypoint on said graphical display;
   graphically selecting one of said options from said menu to open a dialog box corresponding to said one of said options; and
   entering additional data relating to said one of said options in said dialog box, wherein said dialog box comprises a plurality of inputs, each of said plurality of inputs corresponding to an air traffic control parameter, wherein said inputs are processed at said computer to execute said one of said options and to modify said flightplan for said aircraft.

2. The method of claim 1 further comprising the step of obtaining feedback about said inputs from a graphical display in said dialog box, wherein said graphical display shows a proposed course for said aircraft.

3. The method of claim 2 wherein said feedback is obtained prior to executing said one of said options.

4. The method of claim 2 wherein said options comprise a "hold" option.

5. The method of claim 1 wherein said one of said options comprises a "cross" option.

6. The method of claim 1 wherein said one of said options comprises a "procedure turn" option.

7. The method of claim 1 wherein said one of said option comprises a "go direct" option.

8. The method of claim 1 wherein said one of said options comprises a "show info" option.

9. The method of claim 4 wherein said plurality of inputs correspond to a radial, a leg distance, and a turn direction to define a holding pattern for said aircraft about said waypoint.

10. The method of claim 9 wherein said holding pattern is displayed on a graphical display in said dialog box prior to acceptance by a pilot.

11. A digital storage medium having computer-executable instructions stored thereon for executing the method of claim 10.

12. The method of claim 7 wherein said plurality of inputs comprise a first radio button for selecting direct flight to said waypoint, a second radio button for selecting direct flight to said waypoint via a selectable course, and a third radio button for selecting direct flight to a radial associated with said waypoint.

13. The method of claim 6 wherein said plurality of inputs comprise a leg distance and a turn angle to define a procedure turn.

14. The method of claim 13 wherein said procedure turn is displayed on a graphical display.

15. A digital storage medium having computer-executable instructions stored thereon for executing the method of claim 14.

16. The method of claim 5 wherein said plurality of inputs comprise a time to cross said waypoint, an airspeed for crossing said waypoint, and an altitude parameter for crossing said waypoint to define a light routine for crossing said waypoint.

17. The method of claim 16 wherein said flight routine is displayed on a graphical display in said dialog box.

18. The method of claim 17 wherein said graphical display comprises an altitude representation of said flight routine.

19. A digital storage medium having computer-executable instructions stored thereon for executing the method of claim 17.

20. A digital storage medium having computer-executable instructions stored thereon for executing the method of claim 18.

21. A display providing information to a pilot of an aircraft, said display comprising a dialog box configured to graphically accept information provided by said pilot, wherein the layout of said dialog box corresponds to conventional air traffic control (ATC) language associated with a flight procedure.

22. The display of claim 21 wherein said flight procedure is a hold procedure, and wherein said dialog box comprises inputs for radial, leg distance and turn direction.

23. The display of claim 22 wherein said dialog box further comprises a graphical representation of a proposed hold pattern executed by said aircraft.

24. The display of claim 21 wherein said flight procedure is a "go direct" procedure.

25. The display of claim 21 wherein said flight procedure is a "procedure turn" procedure.

26. The display of claim 21 wherein said flight procedure is a "cross" procedure.

27. The display of claim 21 wherein said flight procedure is an "orbit" procedure.

28. The display of claim 21 wherein said flight procedure is a "radial" procedure.

* * * * *